(12) United States Patent
Sankaranarayanan et al.

(10) Patent No.: US 9,384,389 B1
(45) Date of Patent: Jul. 5, 2016

(54) DETECTING ERRORS IN RECOGNIZED TEXT

(75) Inventors: Viswanath Sankaranarayanan, Tamil Nadu (IN); Sridhar Jayaraman, Tamil Nadu (IN)

(73) Assignee: Amazon Technologies, Inc., Reno, NV (US)

( * ) Notice: Subject to any disclaimer, the term of this patent is extended or adjusted under 35 U.S.C. 154(b) by 456 days.

(21) Appl. No.: 13/612,273

(22) Filed: Sep. 12, 2012

(51) Int. Cl.
*G06K 9/00* (2006.01)

(52) U.S. Cl.
CPC .................. *G06K 9/00456* (2013.01)

(58) Field of Classification Search
CPC .................... G06K 2209/01; G06K 2209/011; G06K 2209/013; G06K 2009/0042; G06K 2000/00489
See application file for complete search history.

(56) References Cited

U.S. PATENT DOCUMENTS

| 5,265,171 | A  | * | 11/1993 | Sangu ........................... 382/177 |
| 7,526,683 | B1 | * | 4/2009 | Votta et al. ...................... 714/42 |
| 2008/0063279 | A1 | * | 3/2008 | Vincent et al. ................. 382/182 |

* cited by examiner

*Primary Examiner* — Kim Vu
*Assistant Examiner* — Molly Delaney
(74) *Attorney, Agent, or Firm* — Lee & Hayes, PLLC (57) ABSTRACT

Some examples include detecting errors in text that has been recognized using automated text recognition technology. For instance, errors in the recognized text may be detected based on glyph image similarity and the use of a language model, dictionary information, or the like. Some implementations may group together glyphs based on association of the glyphs with the same glyph identifier and a similarity of the appearance of the glyphs. Furthermore, the words associated with each glyph may be checked against a language model, such as to check a spelling or other validity of the words, and a score may be assigned to each group of glyphs based on the validity of the words corresponding to the glyphs in that group. Groups that have a score that fails to meet a threshold may be reviewed by a person or may undergo automated correction techniques.

25 Claims, 8 Drawing Sheets

DETECTING ERRORS IN RECOGNIZED TEXT

BACKGROUND

The continued proliferation of digital content items has led to an increase in the availability of such content items, as well as an increase in the availability of electronic devices and applications used for consuming these content items. For instance, users read text-based content items, such as electronic books (eBooks), magazines, newspapers, documents, or other textual content on an assortment of electronic devices. Many of these text-based content items were originally created as physical printed items. Thus, to make these printed items available as digital content items, the text may be scanned or otherwise imaged, and then the text may be recognized using automated text recognition technology, such as optical character recognition. However, automated text recognition techniques may be susceptible to errors.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure includes techniques and arrangements for detecting errors in text that has been recognized using automated text recognition technology. As one example, a framework herein may detect errors in digital text that may result from optical character recognition (OCR). Further, some implementations include techniques to automatically identify or correct errors in OCR-recognized text based on glyph image similarity and the use of a language model, dictionary information, or the like. Accordingly, human review of suspected text recognition errors and manual correction of text recognition errors may be reduced or eliminated.

Some examples are based, at least in part, on grouping together letters or other glyphs based on similarity of appearance. For instance, the same letter often may appear the same throughout most parts of a particular book. Accordingly, the techniques herein at least partially utilize this information for efficient clustering of glyphs for error detection.

Further, each glyph is already associated with a particular word in a set of words in the text. Thus, a language model may be employed to check a validity of these words, and a score may be assigned to each group of glyphs. For instance, the score for a particular group may be based on how one or more particular words corresponding to one or more respective glyphs in the group conform to the language model. As one example, the word corresponding to a glyph may be checked against dictionary information to determine whether the word is spelled correctly based on the current recognized text. Thus, if the spelling is correct, then the word is considered a valid word in the language model, and the overall score of the group containing the corresponding glyph may be increased. On the other hand, if the check of the word against the dictionary information shows that the word is not a valid word, then the overall score of the group may be reduced. If the scoring of a particular group shows that a large percentage of words associated with the particular group are misspelled or not in the dictionary, the score of the group may fail to meet a normalized or threshold score. Groups that have a score that fails to meet the threshold may be flagged to be review by a person, or may go through automated correction techniques.

Furthermore, groups that are very sparsely populated (e.g., below a sparseness threshold) can also be highlighted or flagged for human inspection and correction. For instance, a group score for a sparsely populated group may be unreliable because only a small sampling of glyphs is available for determining the score. Therefore, in some examples, very sparse groups of glyphs may be submitted for human review.

Some implementations provide techniques and frameworks to detect OCR errors based at least in part on grouping together letters or other glyphs of textual content that are similar to one another in appearance. Further, the groups may be formed to ensure that all of the glyphs in the same group are associated with the same glyph identifier (e.g., the same code point). In addition, some examples provide a mechanism to score the groups of glyphs based on a language model to detect suspect groups that may include members that are misidentified by being associated with an incorrect glyph identifier.

As one example application, in the electronic publishing industry, a content provider may receive, and make available to consumers, hundreds of thousands of content items. Many of these content items may only be available in printed form. Thus, in some implementations herein, a printed content item may be scanned or otherwise imaged, and a computing device may perform OCR on the image to recognize the text in the image and create a digital version of the printed content. The resulting OCR text may then be subjected to further processing to detect errors and to perform automated or manual correction of any detected errors. For example, clustering of glyphs into groups based on similarity of appearance and comparison of recognized text with a language model may be used to determine whether any glyphs in the text have been misidentified or mislabeled by the OCR process.

For discussion purposes, some example implementations are described in the environment of detecting errors in recognized text of a content item, such as a book. However, the implementations herein are not limited to the particular examples provided, and may be extended to detecting OCR errors in digital versions of other types of content items, printed items, and images that include text.

Example Frameworks

Figure 1:
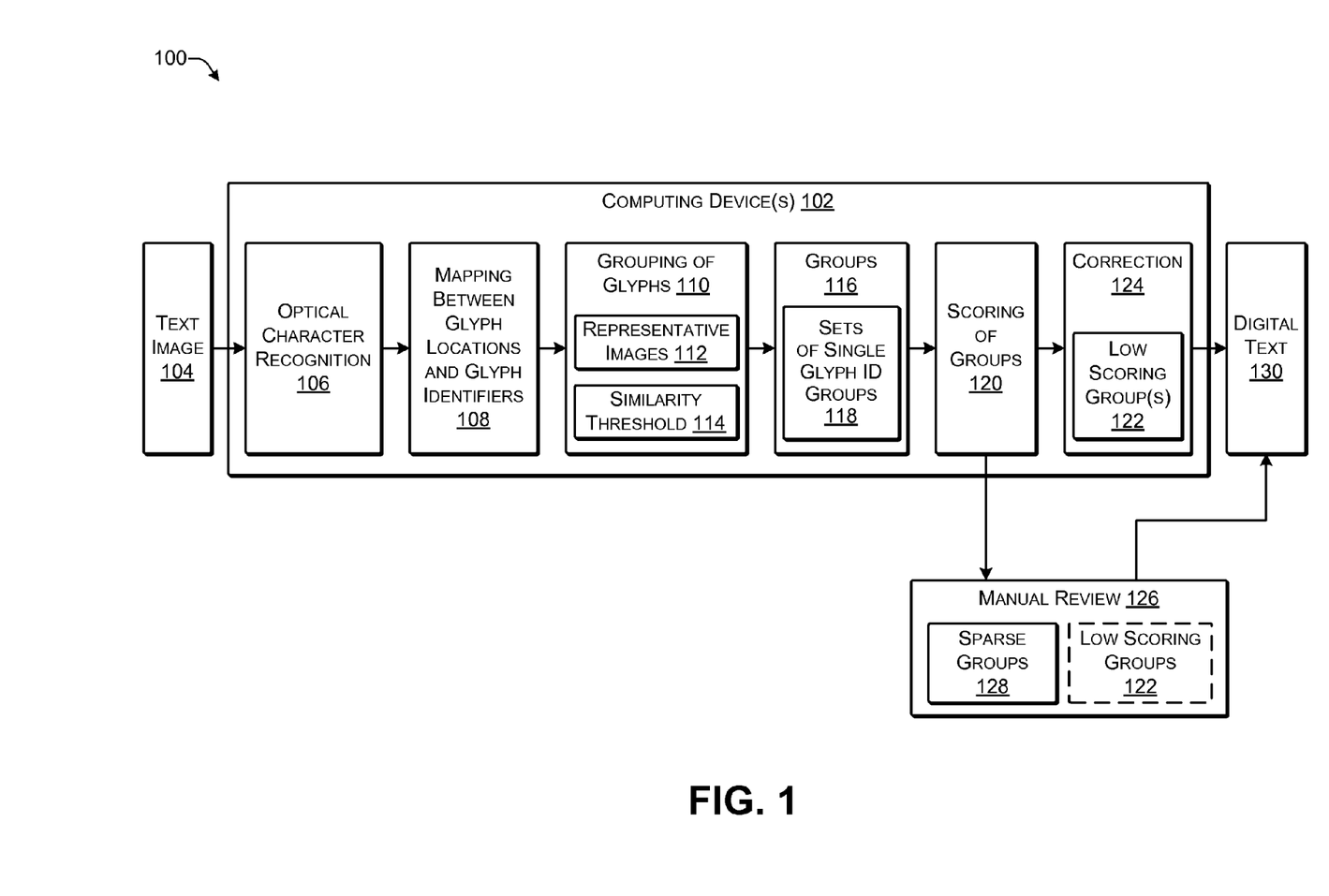
FIG. 1 illustrates an example framework for detecting errors in recognized text according to some implementations.

FIG. 1 illustrates an example framework 100 for detecting errors in recognized text according to some implementations. Portions of the framework 100 may be executed by one or more computing devices 102, such as one or more computing devices of a content provider or any other entity that receives and converts to digital text a text image 104, such as an image of printed text or other image that includes text. Accordingly, implementations herein are not limited to any particular source, use or purpose for the text that is processed according to the implementations herein. In some examples, the framework 100 may be used to automatically determine or assess the accuracy of text recognition performed on the text image 104, such as without human intervention. Further, in some examples, the framework 100 may be used to identify errors automatically and/or correct errors detected in the recognized text.

The computing device 102 may access, obtain, or otherwise receive the text image 104. For example, the text image 104 may be received as a printed book, or other printed document that may be scanned using a scanner, a camera, or other text-imaging device (not shown). In other examples, the text image 104 that is received or accessed by the computing device 102 may be an image of a printed book or other document that has already been scanned, photographed or created using other imaging technology, such as microfilm, slides, video images, video recordings of text, or the like. For example, the publisher, author, content provider, or other entity may provide the text image 104 in one or more image formats. The text image 104 may be provided to the computing device 102, at least in part, to enable conversion to digital text, such as to Unicode, ASCII (American Standard Code for Information Interchange), Universal Character Set, or any other type of digital character encoding that enables identification or manipulation of particular characters in the text.

As indicated at 106, the text image 104 may be recognized using OCR technology. As one example, OCR processing may be performed during or after a printed document is scanned by a scanner. Thus, the text image 104 may be generated as part of the OCR processing, such as while scanning a printed content item. As another example, the OCR processing may be performed to recognize text from a received text image 104 that contains a plurality of glyphs. In some implementations, a glyph may include any element of writing, such as an individual mark on a written medium that contributes to the meaning of what is written. Examples of glyphs include characters, letters, numbers, symbols, punctuation marks and other writing elements.

Any suitable type of OCR technology may be used with the implementations herein. As one example, matrix matching (or pattern matching) OCR may be used, which attempts to associate a perceived glyph with a stored collection of bit-mapped patterns or outlines of characters. When an image of a glyph corresponds to one of the stored bitmaps or patterns within a certain level of confidence, an OCR module may identify that glyph image as the equivalent plain text character. Additionally, or alternatively, in other examples, the OCR herein may include feature extraction and topological feature analysis in which an OCR module searches for common features of a glyph, such as open spaces in a character, closed forms, horizontal lines, vertical lines, curved shapes, intersecting lines, and so forth, to perform pattern recognition based on known features of glyphs.

The computing device 102 may determine a mapping 108 between the locations of glyphs and corresponding glyph identifiers. In some examples, the glyph identifiers may be code points of a character encoding system such as Unicode, ASCII or other scheme for identifying individual characters or other glyphs to a computing device. A location of each glyph recognized in the text image 104 may be associated with a corresponding code point or other glyph identifier. For instance, Unicode and ASCII provide code points that are associated with respective capital and lowercase characters in the Latin alphabet. Thus, for code points in decimal format, numbers 65-90 correspond respectively to capital letters A-Z and numbers 97-122 correspond respectively to lowercase letters a-z. These decimal numbers may be converted to binary code, hex or the like, to be readable by a computing device. Other glyphs, such as numbers, punctuation marks and symbols are similarly assigned unique code points in these character encoding systems.

Based on the OCR results, the computing device 102 may create the mapping 108 between glyph locations in the text image 104 and glyph identifiers or code points. For example, as a result of the OCR, each glyph may be associated with, or identified as, a particular character such as a letter of the alphabet, a number, a punctuation mark, or the like. Further, the location of each glyph that is identified in the text image 104 may be noted or recorded, and the location may be mapped to the identifier for the glyph in the mapping 108. Thus, each different glyph identifier may have a plurality of glyph locations mapped thereto, with each location corresponding to a glyph in the text that has been identified by OCR as corresponding to that glyph identifier.

At 110, the computing device may perform clustering or grouping of glyphs recognized from the text image 104. In some cases, the grouping may be based on a comparison of each glyph with a representative image 112, within a similarity threshold 114, to determine if there is sufficient similarity to add the glyph to that cluster or group 116. For example, the computing device may start a new group 116 for each new glyph in a string of text when there is not already an existing group 116 having a representative image 112 that matches the new glyph within a similarity threshold 114. For example, the computing device may compare each glyph, such as on a pixel-by-pixel basis, with the representative image 112 of each existing group to determine if there is a match. When there is no match within the similarity threshold level of confidence, a new group 116 may be created for the glyph, and the computing device 102 may proceed to the next glyph in the string of text.

In addition, when creating the groups 116 and adding new glyph members to a group 116, the as computing device 102 may only group together those glyphs that have the same glyph identifier associated therewith. Thus, as indicated at 118, the computing device 102 may identify sets of groups 116 that correspond to the same code point, i.e., to the same character, letter, number, or other glyph identifier. For example, a plurality of groups may correspond to the same code point glyph identifier even though the representative image for the groups may be somewhat different. For instance, different fonts may use different shapes of lowercase "a." Additionally, in some cases the OCR may incorrectly identify a glyph as corresponding to a first glyph identifier, when the glyph may actually correspond to a different glyph identifier. For example, OCR often may mistake a number "1" for a lowercase letter "l" and vice versa. Similarly, lowercase "c" and "e" may be often mistaken for one another; "5" and "S" may be mistaken for one another; "8" and "B" may be mistaken for one another; "rn" and "m" may be mistaken for one another, and so forth, to name a few frequent OCR mistakes. Accordingly, there may be a plurality of groups 116 for a single glyph identifier.

As indicated at 120, the computing device 102 may determine which groups actually correspond to the particular glyph identifiers associated therewith. As one example, the computing device 102 may perform scoring of the groups 116. For example, the computing device 102 may select one or more of the glyphs from each group 116 and may perform a spell check on the word in the text in which the glyph is included. Thus, if there are several groups for a particular letter, such as lower case "c," the computing device 102 may select one or more samples from each group to determine whether the corresponding word in the recognized text is a valid word. As one example, the computing device 102 may add a positive score to the overall group score if the word is spelled correctly, and may subtract or add a negative score to the overall group score if the word is spelled incorrectly. Consequently, each group may have a score associated therewith based on the spell checking. Any low scoring groups 122 that have a score that is below a threshold score may be flagged or a record may be stored to indicate that the glyphs in the group 122 may have been incorrectly identified during the OCR. Further, in some cases, a plurality of samples may be taken from each group 116 during the scoring 120 to obtain a valid sampling of group 116. For example, words corresponding to the glyphs may be misspelled due to other OCR errors in recognizing other letters in the word, rather than necessarily due to an error in recognition of a current glyph.

In some examples, as indicated at 124, the computing device 102 may perform correction of the assigned glyph identifier for any low scoring groups 122. For instance, the computing device 102 may use the representative image 112 of the group to attempt to determine the correct glyph identifier for the group 116. As another example, the computing device may substitute a probable alternative glyph identifier for the group 116, such as based on the common mistakes described above, and may then rescore the group to determine if the score of the group improves substantially with user of the alternative glyph identifier. If the score for the group shows substantial improvement, then the computing device may assign the alternative glyph identifier to the group and to all the glyph locations in the text corresponding to the particular group 116.

As another example, the computing device 102 may compare one or more images of the glyphs in the low scoring group with images of known text characters or with representative images of highly scored groups. For example, the computing device 102 may employ a Euclidean distance to identify a probable alternative glyph identifier for a glyph identifier that is in a low scoring group. For example, the Euclidean distance may identify a similarity between a glyph in the low scoring group and a selected known character or a representative image of a high scoring group. If the score for the low scoring group shows substantial improvement, then the computing device 102 may assign the glyph identifier of the known character or representative image to the group and to all the glyph locations in the text corresponding to the particular group 116.

Additionally, the comparison may be multi-dimensional such as based upon a number of features identified for each glyph, differences in gray levels, and so forth. For example, the comparison may include comparison of features such as how many corners each image has, how many curves each image has, how many right angles each image has, etc, and use these types of features when determining the distance between two images. Upon performing a correction, all of the scores for all of the groups may be recalculated. For instance, the words associated with the glyphs in the group may now be spelled correctly, which may affect the scores of other groups as well.

Alternatively, as indicated at 126, rather than attempting to use automated techniques to identify the correct glyph identifier for a low scoring group 122, the computing device 102 may forward information related to the low scoring group 122 to a computing device of a human reviewer (not shown in FIG. 1) to enable the human reviewer to perform a manual review. For example, the computing device 102 may provide the low scoring group 122 and/or one or more excerpts of text corresponding to the locations in the low scoring groups 122 to the human reviewer for manual review. In other examples, the computing device may merely flag the low scoring group 122, and the human reviewer may subsequently access and correct any flagged low scoring group 122. Additionally, following receipt of the correct glyph identifier for a group from the human reviewer, all of the scores for all of the groups may be recalculated. For instance, a plurality of words associated with the glyphs in the group may now be spelled correctly, which may affect the scores of other groups. Further, the reviewer may manually correct one or more words, may manually add a word to a dictionary or language model information used to check spelling, or the like, which may also affect the scores of a plurality of groups.

In addition, the computing device 102 may identify any sparse groups 128 that have very few members. These sparse groups may also be closely scrutinized by the computing device 102 and/or sent for human review. For example, a score associated with very sparse groups may be unreliable due to the sparsity of the number of samples available.

When any automatic or manual correction has been completed, the computing device 102 may provide the checked (and possibly corrected) digital text 130 to another computing device, to a storage device, to a storage medium, or the like. As one example, when the digital text corresponds to a content item, such as an electronic book, the computing device 102 may send the digital text 130 to a content item library, a content item cataloging service, a content item formatting service, or the like.

Figure 2:
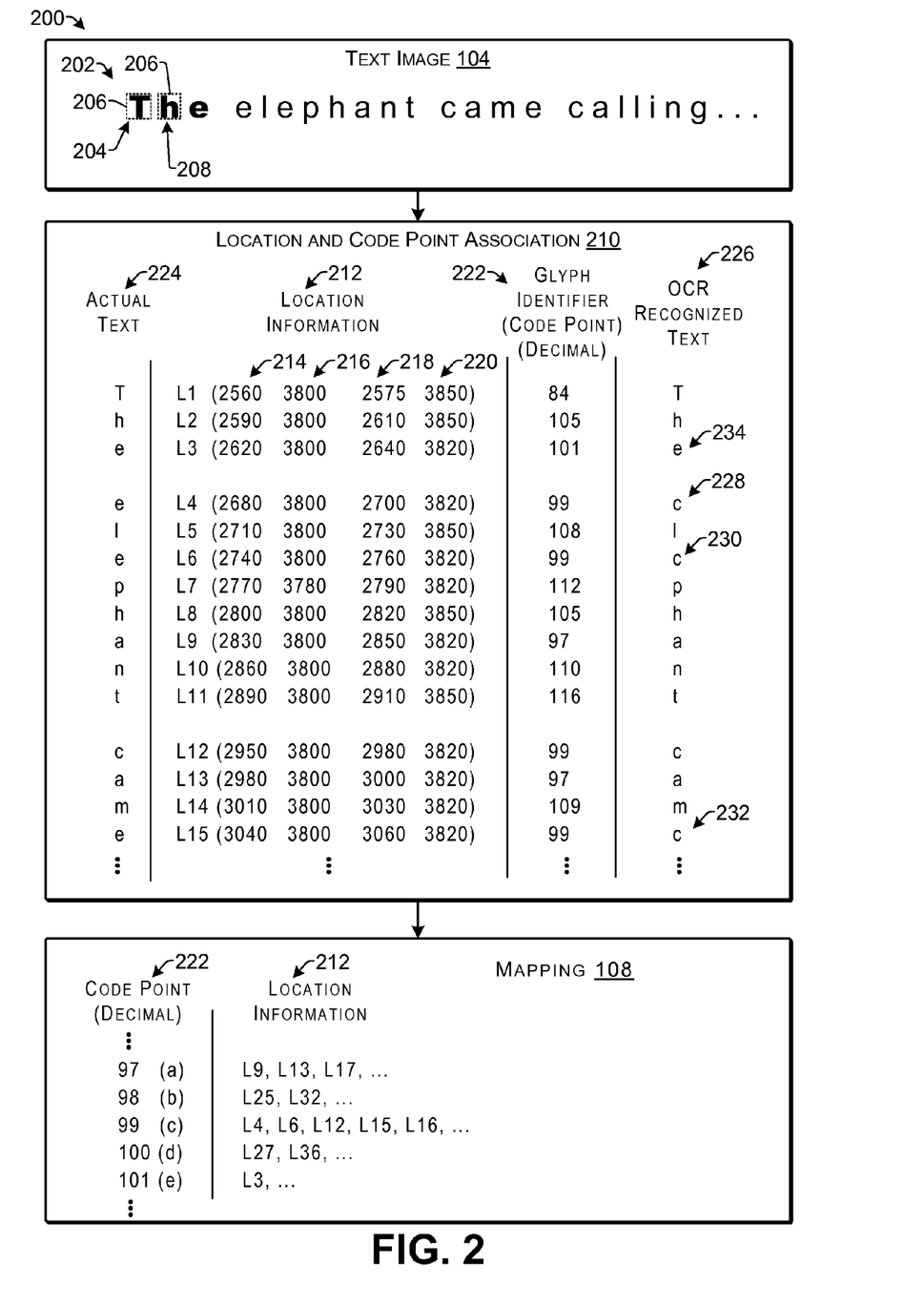
FIG. 2 is an example framework for recognizing text to create a mapping according to some implementations.

FIG. 2 illustrates an example framework 200 for mapping a location of a glyph to a glyph identifier based on OCR according to some implementations. In this example, the text image 104 includes a text string 202 including the words "The elephant came calling . . . ." Further, in this example, the first word of the text 202 is in a different font from a subsequent portion of the text 202, as may sometimes occur at the beginning of a chapter, or the like. An OCR module (not shown in FIG. 2) executing on the computing device 102 may identify a location corresponding to each glyph included in the text string 102. For example, the OCR module may determine that a first glyph 204 (corresponding to a capital "T") may be bounded by an imaginary bounding box 206. Thus, based on the bounding box 206, a location may be assigned to the first glyph 204. As one example, an x-y coordinate system may be assigned to the text image 104, and a location of a lower corner and a diagonally opposed upper corner of the bounding box 204 may be determined based on the x-y coordinate system. For instance, the coordinate system may be base on the x-y coordinates of pixels corresponding to the location of the corners of the bounding box 204. Similarly, another bounding box 206 may be used for assigning location information to a second glyph 208, and so forth.

The OCR module may generate the mapping 108 between the location for each glyph and a code point or other glyph identifier determined by the OCR module to correspond to that glyph. Block 210 illustrates the association between the location information 212 for each glyph and a code point or glyph identifier 222 assigned by the OCR module to that glyph. For instance, location information 212 may identify a location of each particular glyph in the text image 104. In this example, the location L1 of the first glyph "T" is represented by x-y coordinates of opposing corners of a bounding box. Thus, the location information may include an x coordinate 214 and a y coordinate 216 of a first corner of the bounding box, and an x coordinate 218 and a y coordinate 220 of a second corner of the bounding box that is diagonally opposite to the first corner. Further, while x-y coordinates of a bounding box are used for location information 212 in this example, in other examples, any other suitable technique for identifying a location of the glyph may be used, such as by counting glyphs from a start of a text string or other suitable reference point.

As illustrated in block 210, the location information 212 for each glyph maps to a glyph identifier 222 identified by the OCR module as corresponding to that glyph. For example, the Unicode code point for capital "T" is "84" in decimal. Thus, a code point or other glyph identifier determined by the OCR module for each glyph may be associated with location information for that glyph. Further, the actual text 224 and the OCR recognized text 226 may not be included in the mapping 108, but are provided in block 210 in the example of FIG. 2 to aid the reader's understanding.

In addition, as indicated at 228, 230 and 232, the resulting OCR recognized text 226 may not always be accurate. In this example, suppose that the OCR module mistakenly identified the glyphs at locations L4, L6 and L15 as lowercase "c," when these glyphs are lowercase "e" in the actual text 224. On the other hand, as indicated at 234, the lower case "e" at location L3 may be accurately identified as lowercase "e" since it may be a different size, different font, different text style, or the like.

The association 210 between the location 212 for each glyph and the glyph identifier 222 assigned by the OCR module may be used to generate the mapping 108, which may be a many-to-one mapping of a plurality of locations to a particular glyph identifier 222. Thus, in the example of FIG. 2, an illustrative portion of the mapping 108 includes the code points 97-101, which correspond to lowercase a-e, respectively. The locations of glyphs that were identified by the OCR as belonging to each glyph identifier 222 are mapped to the corresponding glyph identifier 222 in the mapping 108. Thus, for example, glyphs at locations L4, L6, L12, L15 and L16 are mapped to code point 99, which corresponds to lowercase "c." Accordingly, the mapping 108, for each glyph identifier, provides a listing of the locations of glyphs in the text string that were identified by the OCR module as corresponding to that glyph identifier (i.e., that letter of the alphabet).

Figure 3:
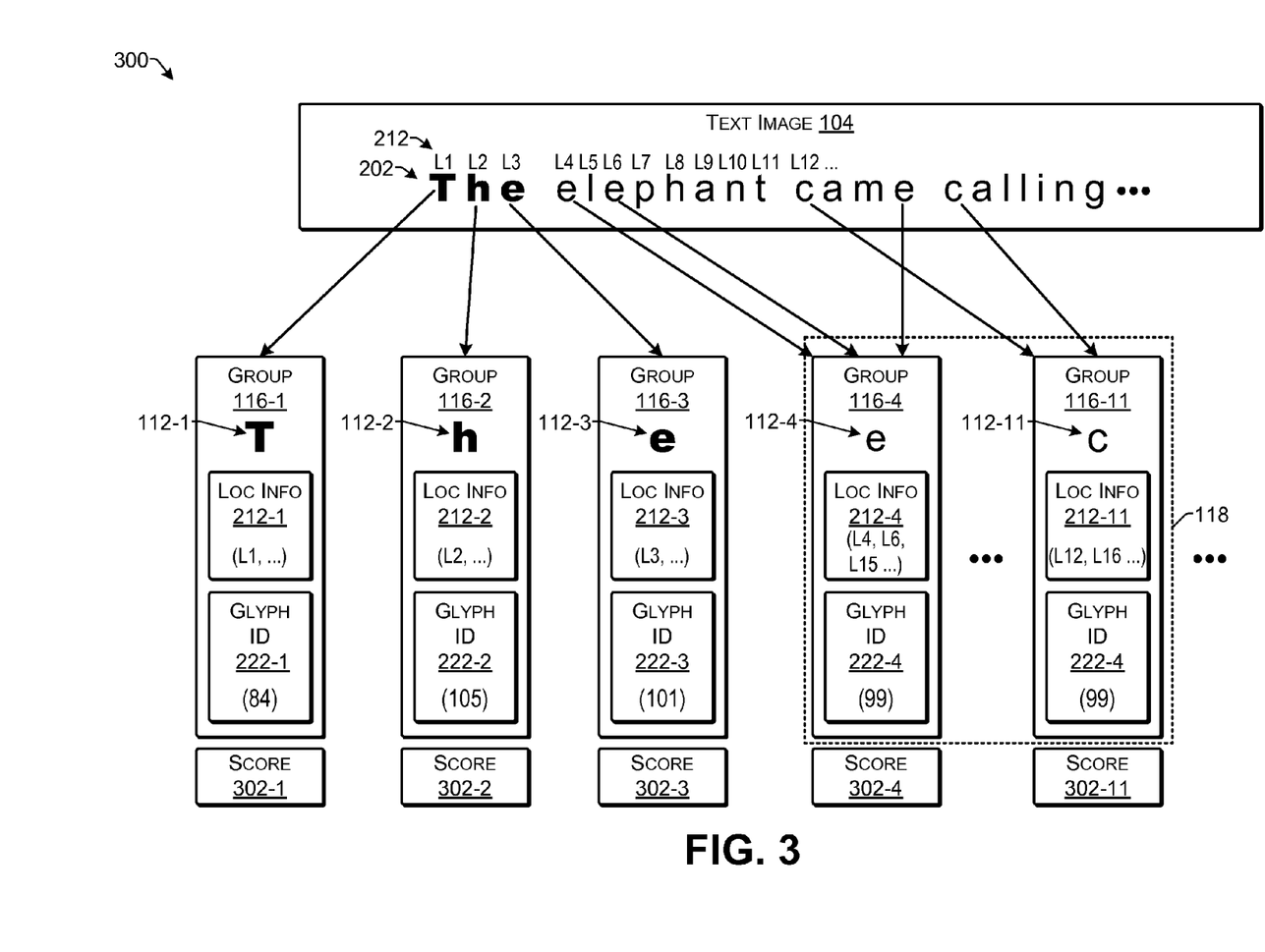
FIG. 3 is an example framework for clustering glyphs into respective groups based, at least in part, on appearance according to some implementations.

FIG. 3 illustrates an example framework 300 for clustering glyphs for each glyph identifier into one or more groups based on appearance according to some implementations. In this example, a clustering module (not shown in FIG. 3) may traverse through the glyphs in the text string 202 to classify each glyph into a particular one of a plurality of clusters or groups 116 based on the appearance of each glyph and further based on having same glyph identifier. Accordingly, the clustering module may start at a beginning of the text string 202 at location L1, and may encounter the capital "T." Since there are currently no groups yet created, the clustering module may initialize a first group 116-1 and may use the image of the capital "T" as a representative image 112-1 of the first group 116-1. Location information 212-1 (i.e., location L1) and the glyph identifier 222-1 (i.e., Unicode code point 84) for this glyph may be obtained from the mapping 108 discussed above, and this location information 212-1 and glyph identifier 222-1 may be associated with the first group 116-1.

Next, the clustering module may encounter the second glyph, lowercase "h," at location L2 in the text string 202. Because the second glyph corresponds to a different glyph identifier 222-2 than the first cluster 116-1, the clustering module does not perform a pixel-by-pixel comparison of the second glyph at location L2 with the representative image 112-1 of the existing group 116-1. Instead, the clustering module may create a second group 116-2 and use the lowercase "h" as the representative image 112-2 for the second group 116-2. Furthermore, the clustering module may associate location information 212-2 and the glyph identifier 222-2 with the second group 116-2 based on the location L2 of the second glyph in the text string 202.

Next, the clustering module may encounter the third glyph, lowercase "e," at location L3 in the text string 202. Because the location of the third glyph corresponds to a different glyph identifier than the first group 116-1 or the second group 116-2, the clustering module does not perform a pixel-by-pixel comparison of the third glyph at location L3 with the representative image 112-1 of the existing group 116-1 or the representative image 112-2 of group 116-2. Instead, the clustering module may create a third group 116-3 and use the lowercase "e" as the representative image 112-3 for the third group 116-3. Furthermore, the clustering module may associate location information 212-3 and a glyph identifier 222-3 with the third group 116-3 based on the location L3 of the third glyph in the text string 202.

Next, the clustering module may encounter the fourth glyph, lowercase "e," at location L4 in the text string 202. Because the location of the fourth glyph corresponds to a different glyph identifier than the first group 116-1, the second group 116-2, and the third group 116-3, the clustering module does not perform a pixel-by-pixel comparison of the third glyph at location L3 with the representative images 112-1, 112-2 or 112-3 of the existing groups 116-1, 116-2, 116-3, respectively. Instead, the clustering module may create a fourth group 116-4 and use the lowercase "e" from location L4 as the representative image 112-4 for the fourth group 116-4. Furthermore, the clustering module may associate location information 212-4 and a glyph identifier 222-4 (i.e., code point 99 corresponding to lowercase "c" as discussed above with respect to FIG. 2) with the group 116-4 based on the location L4 of the fourth glyph in the text string 202.

The clustering module may then encounter the fifth glyph, a lowercase "l," and may create a cluster (not shown in FIG. 3) for the lower case "l." Next, the clustering module may encounter the sixth glyph, lowercase "e," at location L6 in the text string 202. Because, from the mapping 108, the location L6 of the sixth glyph corresponds to the same glyph identifier (code point 99) as group 116-4, the clustering module may perform a comparison, such as a pixel-by-pixel comparison of the sixth glyph at location L6 with the representative image 112-4 of the existing group 116-4. If the sixth glyph matches the representative image 112-4 within the similarity threshold level of confidence based on the pixel-by-pixel comparison, then the location information L6 for the sixth glyph is added to the group 116-4. Otherwise, if there were not a match, a new group would be created. In this case, however, there is a match, so the glyph location L6 is added to the location information 212-4.

Subsequently, the following creation of several other groups (not shown), clustering module encounters the $12^{th}$ glyph at location L12, which is a lowercase "c." Because, from the mapping 108, the location L12 of the 12$^{th}$ glyph corresponds to the same glyph identifier as group 116-4 (i.e., code point 99, lowercase "c"), the clustering module may perform a comparison, such as a pixel-by-pixel comparison, of the 12$^{th}$ glyph at location L12 with the representative image 112-4 of the existing group 116-4. If the 12$^{th}$ glyph matches the representative image 112-4 within the similarity threshold level of confidence based on the comparison, then the location information L12 for the 12$^{th}$ glyph would be added to the group 116-4. In this case, however, the comparison with the representative image 112-4 does not result in a match. Thus, the clustering module creates a new group 116-11 that includes the same glyph identifier 222-4 as the fourth group 116-4, but different location information 212-11, namely glyph location L12 in this example. Accordingly, a set or grouping of single glyph identifier groups 118, including groups 116-4 and 116-11, may be created. For example, both the groups 116-4 and 116-11 correspond to the glyph identifier 222-4 (e.g., Unicode code point 99 for the lowercase letter "c") even though some glyphs corresponding to the group 116-4 may actually be incorrectly identified as lowercase "c."

After clustering of the glyph locations into the respective groups 116, a score 302 may be determined for at least some of the groups 116. In some cases, a score 302 may be determined for each group 116. In other cases, a score 302 may only be determined for sets of groups 118 in which multiple groups share the same glyph identifier 222. Accordingly, for at least groups 116-4 and 116-11, respective scores 302-4 and 302-11 may be determined. For example, a scoring module (not shown in FIG. 3) executed on the computing device 102 may select one or more of the instances of location mappings from each group 116 and may perform a spell check on the word in which the instance is included. Thus, the computing device 102 may select one or more samples from each group to determine whether the corresponding word in the OCR text is a valid word. The scoring module may add a positive score to the overall group score 302 if the word is spelled correctly, and may subtract or add a negative score to the group score 302 if the word is spelled incorrectly. In the example, of FIG. 3, scoring based on the locations L4, L6 and L15 using a the lower case "c" results in the words "cicphant" and "camc," both of which are words not found in an English-language dictionary. Consequently, group 116-4 would have a low score 302-4. On the other hand, scoring based on locations L12 and L16 using the lower case "c" would result in a higher score 302-11 because at least "calling" is a properly spelled word. Thus, each group may have a score 302 associated therewith based at least on spell checking.

Alternatively, or additionally, other language model comparisons may be used to check the validity of a word corresponding to a glyph. For example, the scoring module may look at a word that occurs before and after the word corresponding to the glyph, and may compare two-word and three-word N-grams with the language model to determine whether such word combinations occur frequently or infrequently in the language model. For example, if the N-grams occur infrequently, this may be an indication that the word corresponding to the glyph is not valid, even though it is spelled correctly according to dictionary information. Similarly, the scoring module may take into consideration a typical frequency of the word itself in the language model, such as frequency of the particular word in a large corpus of the language.

Further, as mentioned above, in some examples, all of the groups 116 may be scored. Following scoring of the groups 116, any low scoring groups 122 that have a score that is below a threshold score may be flagged or otherwise noted to have possibly been incorrectly identified by the OCR module. In some cases, the low scoring groups may be automatically corrected by the computing device 102, as discussed above, while in other cases, information related to the low scoring groups may be provided to a human for review. Upon performing a correction, all of the scores for all of the groups may be recalculated. For instance, a plurality of words associated with the glyphs in a number of groups may now be spelled correctly, which may affect the scores of the groups.

Example Architecture

Figure 4:
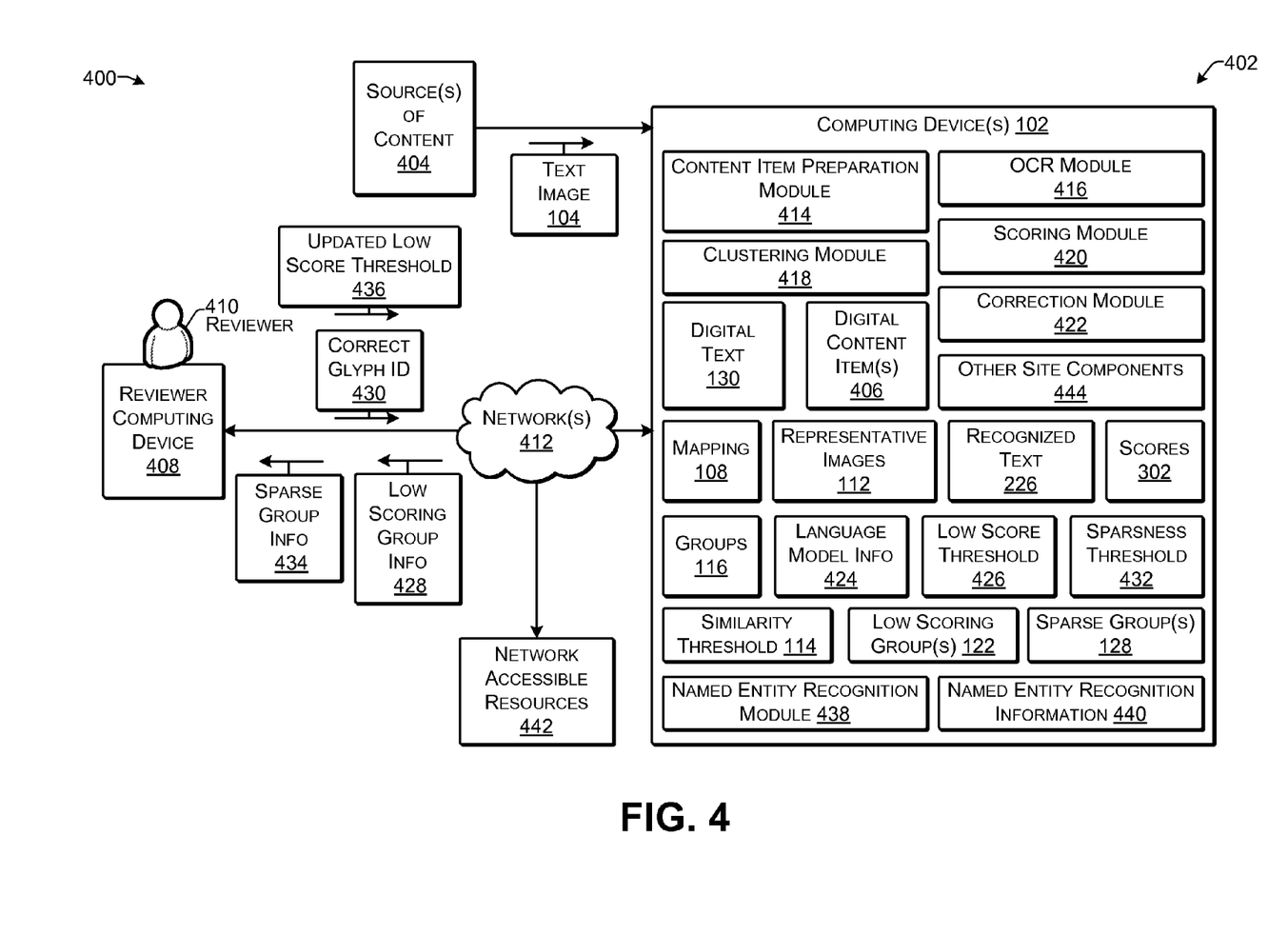
FIG. 4 illustrates an example architecture of a system for detecting errors in recognized text according to some implementations.

FIG. 4 illustrates an example architecture of a system 400 including the one or more computing devices 102 according to some implementations. In some cases, the computing device 102 may be associated with a content provider 402, and may be used to process text image 104 received from a source 404 of content, such as to provide one or more digital content items 406. As one example, the content provider 402 may provide a merchant website, an e-commerce site, or the like, that offers content items to the public. For instance, the content provider 402 may offer digital content items 406, such as electronic books, magazines, newspapers, and so forth, to the public through a website, other type of electronic commerce site, an online location, or the like. In some examples, the content provider 402 may alternatively, or additionally, provide content items through an online or mobile application executable on a consumer electronic device (not shown), such as an eBook reader, smart phone, tablet computing device, or the like.

In some examples, the digital content item 406 may be an electronic book (eBook) having one or more pages including text, illustrations, photographs, tables, maps, charts, graphic elements or the like. The term "eBook," as used herein, may include electronic or digital representations of printed works, as well as digital content that may include text, multimedia, hypertext, and/or hypermedia. Examples of content items 406 include, but are not limited to, electronic versions of books, magazines, newspapers, periodicals, journals, reference materials, textbooks, anthologies, instruction manuals, proceedings of meetings, forms, directories, plays, screen plays, closed caption transcripts of movies and television shows, song lyrics, and so forth. Accordingly, the term "eBook" may include any readable or viewable textual content of a content item that is in electronic or digital form.

The computing device 102 is able to communicate with a reviewer computing device 408 and a human reviewer 410 through one or more networks 412. For example, the network(s) 412 may include a local area network (LAN), a wide area network (WAN), such as the Internet, or any combination thereof, and may include both wired and wireless communication technologies using any suitable protocols and communication techniques. The computing device 102 and the reviewer computing device 408 may communicate and interact with one another using any combination of suitable communication and networking protocols, such as Internet protocol (IP), transmission control protocol (TCP), hypertext transfer protocol (HTTP), and so forth. As another example, the human reviewer 410 may access the computing device 102 directly, such as through one or more I/O devices connected to the computing device 102, and the separate reviewer computing device 408 may not be included in these examples.

In some implementations, the content provider 402 may operate the computing device(s) 102. As one example, the computing device(s) 102 may be one or more web servers located at a data center, server farm, or other single physical location. In other examples, the computing device(s) 102 or portions thereof may be located in diverse locations that are physically remote from one another. Further, in some implementations, the computing device(s) 102 may include a group of websites, data stores, services, and the like, hosted on a plurality of different computing devices 102 at a plurality of diverse locations, or hosted by one or more computing devices 102 at a single location.

The example computing device 102 of FIG. 4 includes a content item preparation module 414 that may receive text image 104 from one or more sources 404 of content. For example, the sources 404 of content item may be publishers, authors, other computing devices of the content provider, a scanner, a text imaging device, and so forth. In the case of textual content, the content item preparation module 414 may receive text image 104 and may control the process of converting the text image 104 to digital text 130, so as to be able to provide a content item 406 that is or can be made to be compatible with various display formats, device platforms, and so forth. For example, the content item preparation module 414 may control the processing of the text image 104 into digital text 130 through use of an OCR module 416, a clustering module 418, a scoring module 420, and a correction module 422. The content item preparation module 414 may then provide the digital text 130 to a storage, make the digital text 130 available to another computing device, or may perform additional processing of the digital text 130 to generate a corresponding content item 406. For example, the content item preparation module 414 may make the content item 406 compatible with various display formats, obtain or generate metadata for the content item 406, and so forth.

As discussed above with respect to FIGS. 1-3, the OCR module 416 may perform optical character recognition on the text image 104, and may further generate mapping 108 to map glyph locations to glyph identifiers, such as code points, identified by the OCR module for the corresponding glyphs in the text image 104. The clustering module 418 may then cluster or group the glyphs associated with particular glyph identifiers into clusters or groups 116, such as based on a similarity of each glyph to a representative image 112 established for each group, as discussed above with respect to FIG. 3.

Following grouping of the glyphs into groups based on appearance and common glyph identifiers, the scoring module 420 may determine a score for one or more of the groups 116, such as based on whether the glyphs corresponding to that group 116 are included in valid words in the OCR recognized text 226. As one example, words in the recognized text 226 that contain the glyphs in each group 116 may be checked against dictionary information or other language model information 424 to determine if the words in the recognized text 226 are valid words. The scores 302 for the groups 116 may be compared with a low score threshold 426 to identify any groups 116 that fail to meet the low score threshold 426 as low scoring groups 122.

Low scoring groups 122 may be processed by the correction module 422 to determine the correct glyph identifier for the glyphs corresponding to the low scoring groups 122. For example, the correction module 422 may substitute an alternative glyph identifier for the current glyph identifier for the low scoring group 122 and then the scoring module 420 may determine a new score 302 for the low scoring group 122 to determine if the low score threshold 426 is still not met. In some cases, the substitution may be performed on a trial and error basis to determine which alternative glyph identifier results in a highest score for the group. In other cases, the correction module 422 may select a likely candidate glyph identifier based on examination of the representative image for the group 116, and substitute the likely candidate. Rescoring may be performed in this case also.

Alternatively, the correction module 422 may send low scoring group information 428 to the reviewer computing device 408 for review by the human reviewer 410. For example, the low-scoring-group information 428 may include at least a portion of the text image 104, and/or a portion of the recognized text 226 that includes at least one of the glyphs from the low-scoring group 122, and/or an identification of a location in the text of one or more of the glyphs in the low scoring group 122. In some examples, the reviewer 410 may provide an indication of a correct glyph identifier 430 to the correction module 422. The correction module 422 may apply the correct glyph identifier to all of the glyph locations in the low-scoring group 122. In addition, the reviewer 410 may manually correct one or more words, may manually add a word to the language model information 424, or the like, which may also affect the scores of a plurality of low scoring groups 122.

Furthermore, as mentioned above with respect to a sparse group 128, the score 302 may be unreliable. For example, if a group 116 fails to meet a sparseness threshold 432, e.g., by having a number of members of the group below a threshold number, the group may be identified as a sparse group 128. Thus, sparse group information 434, such as associated text image 104 and/or recognized text 226 and/or location information of the glyphs in the sparse group 128 may be sent to the reviewer computing device 408 to be reviewed by the human reviewer 410. The human reviewer 410 may determine the correct glyph identifier 430 for the glyph(s) in the sparse group(s) 128 and may provide an indication of this information to the correction module 422, which may apply the correct glyph identifier 430 to all the members of the sparse group.

In addition, in some cases, the reviewer 410 may determine that the low score threshold 426 can be adjusted. For instance, by default the low score threshold 426 may be set conservatively. Thus, as particular text images 104 are processed, such as from a common source or content item, the reviewer 410 may receive a number of communications of information 428 for low scoring groups. If a certain quantity of these low scoring groups is actually not in need of correction, the reviewer 410 may adjust the low score threshold 426 to try to capture only those groups 122 that are actually associated with an incorrect glyph identifier. Alternatively, if all of the low scoring groups 122 are in need of correction, this may indicate that the low score threshold 426 is too low and adjustment of the threshold value in the other direction may be appropriate. Accordingly, in some cases, a default low score threshold 426 may be adjusted with an updated low score threshold 436 for each different content item or other source of text to be digitized.

Furthermore, in some cases, computing device 102 may include a named entity recognition module 438 that may identify named entities in the text following OCR. For example, the text may include proper names, organization names, place names, and so forth, that may not be included in the language model information 424, and thus, may not be recognized as being properly spelled. Therefore, rather than marking these words as misspelled, which may lower the scores of one or more groups, the language model information 424 may be augmented by recognizing named entities in the text 104 being processed. For example, following OCR, the named entity recognition module 438 may recognize any named entities in the text, such as by accessing named entity recognition information 440 and/or network accessible resources 442. For example, the named entity recognition information 440 may include lists of common names, nicknames, organization and corporation names, slang names and so forth. Furthermore, external network accessible resources 442 may also be employed, such as Wikipedia®, Shelfari®, IMDb®, other wiki websites, social networking feeds, microblog feeds, and the like, for identifying possible person names, character names, organization names, place names and the like. Words identified by the named entity recognition module 438 may be included when the scoring module checks spelling of various words, or otherwise employs the language model 424 to check word validity.

Additionally, in some examples, the computing device(s) 102 may also include various other site components 444, as is known, depending on the design and intended use of the computing device(s) 102, the business purpose of the content provider 402, and the like. For example, the other site components 444 may include one or more pages of content, such as webpages, webviews, or other online content, that may be presented to a consumer, such as during shopping for content items 406 from the content provider 402.

Example Computing Device(s)

Figure 5:
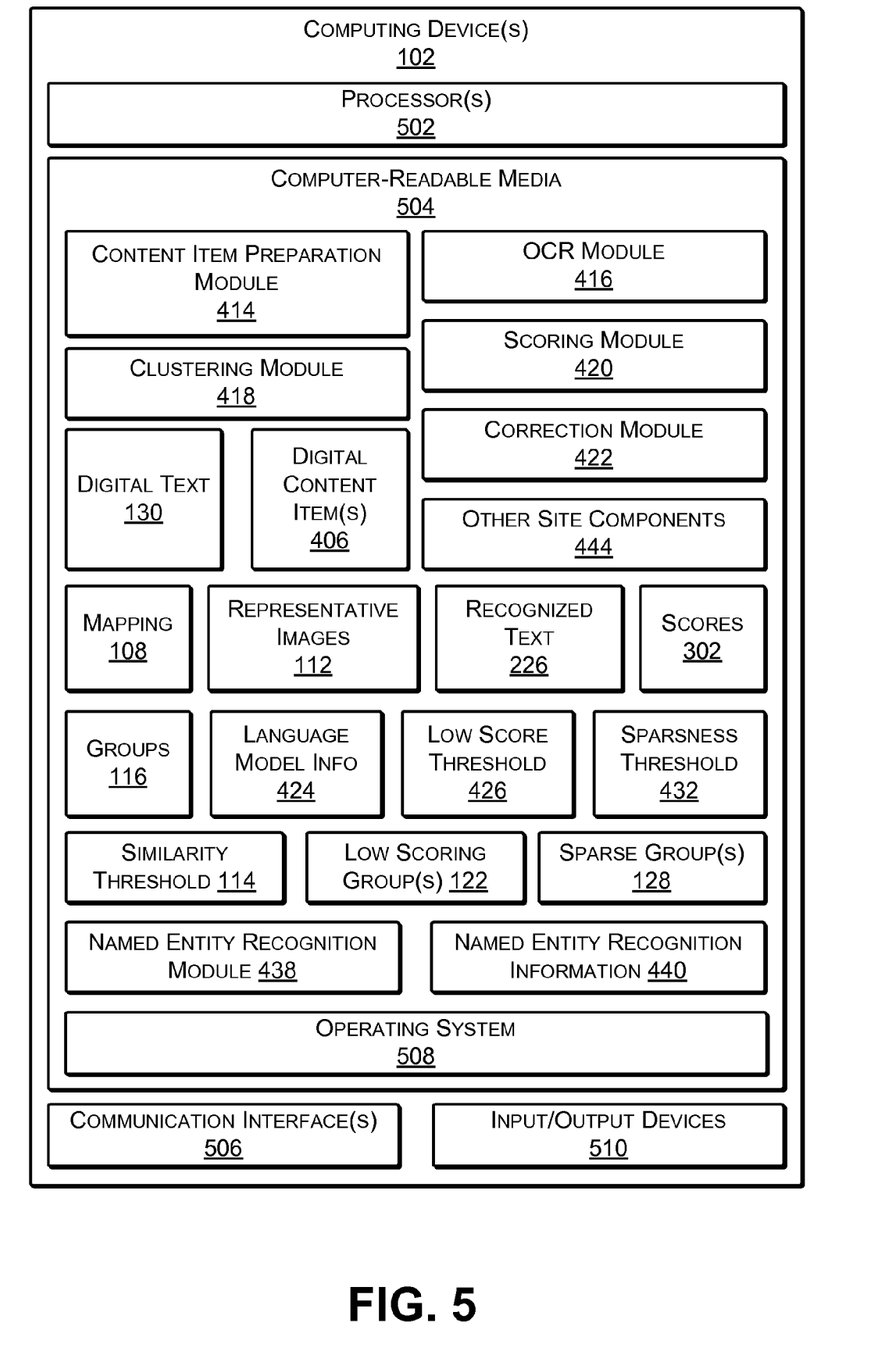
FIG. 5 illustrates select components of one or more example computing devices according to some implementations.

FIG. 5 illustrates select components of one or more computing devices 102 that may be used to implement the functionality described herein according to some implementations. The computing device(s) 102 may include one or more servers or other types of computing devices that may be embodied in any number of ways. For instance, in the case of a server, the computing device(s) 102 may be a single server, a cluster of servers, a server farm or data center, a cloud hosted computing service, and so forth, although other computer architectures (e.g., a mainframe architecture) may also be used. Further, while the figures illustrate the components of the computing device 102 as being present in a single location, it is to be appreciated that these components may be distributed across different computing devices and locations in any manner. Generally, the computing device 102 may be implemented by one or more computing devices, with the various functionality described above distributed in various ways across the different computing devices. The computing devices may be located together or separately, and organized, for example, as virtual servers, server banks and/or server farms. The described functionality may be provided by the computing devices of a single entity or enterprise, or may be provided by the computing devices and/or services of multiple entities or enterprises.

As illustrated in FIG. 5, an example computing device 102 includes one or more processors 502, one or more computer-readable media 504, and one or more communication interfaces 506. The processor(s) 502 may be a single processing unit or a number of processing units, and may include single or multiple computing units or multiple cores. The processor(s) 502 can be configured to fetch and execute computer-readable instructions stored in the computer-readable media 504 or other computer-readable media.

The computer-readable media 504 may include volatile and nonvolatile memory and/or removable and non-removable media implemented in any type of technology for storage of information, such as computer-readable instructions, data structures, program modules or other data. Such computer-readable media includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the computing device 102, the computer-readable media 504 may be a type of computer storage media and may be a non-transitory storage media.

The computer-readable media 504 may be used to store any number of functional components that are executable by the processors 502. In many implementations, these functional components comprise instructions or programs that are executable by the processors 502 and that, when executed, implement operational logic for performing the actions attributed above to the computing device 102. Functional components of the computing device 102 that may be executed on the processors 502 for implementing the various functions and features related to providing and correcting digital text, as described herein, include the content item preparation module 414, the OCR module 416, the clustering module 418, the scoring module 420, the correction module 422 and the named entity recognition module 438. Additional functional components stored in the computer-readable media 504 may include the other site components 444, and an operating system 508 for controlling and managing various functions of the computing device 102.

In addition, the computer-readable media 504 may include, or the computing device 102 may access, data, which may include the digital text 130, the digital content item(s) 406, the mapping 108, representative images 112, recognized text 226, scores 302, groups 116, language model information 424, low score threshold 426, sparseness threshold 432, low scoring groups 122, sparse groups 128 and named entity recognition information 440. In addition, the computing device(s) 102 may include many other logical, programmatic and physical components, of which those described above are merely examples that are related to the discussion herein.

The communication interface(s) 506 may include one or more interfaces and hardware components for enabling communication with various other devices, such as the reviewer computing device 408, over the network(s) 412. For example, communication interface(s) 506 may facilitate communication through one or more of the Internet, cable networks, cellular networks, wireless networks (e.g., Wi-Fi, cellular) and wired networks. Various different approaches to implementations described herein can be implemented in various environments. For instance, the network(s) 412 may include any appropriate network, including an intranet, the Internet, a cellular network, a LAN, WAN, VPN or any other network or combination thereof. Components used for such a system can depend at least in part upon the type of network and/or environment selected. Protocols and components for communicating via such networks are well known and will not be discussed herein in detail.

Computing device 102 may further be equipped with various input/output devices 510. Such I/O devices 510 may include a display, various user interface controls (e.g., buttons, mouse, keyboard, touch screen, etc.), audio speakers, connection ports and so forth. Further, in some examples, the reviewer computing device 408 may include similar hardware components.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Example Processes

Figure 6:
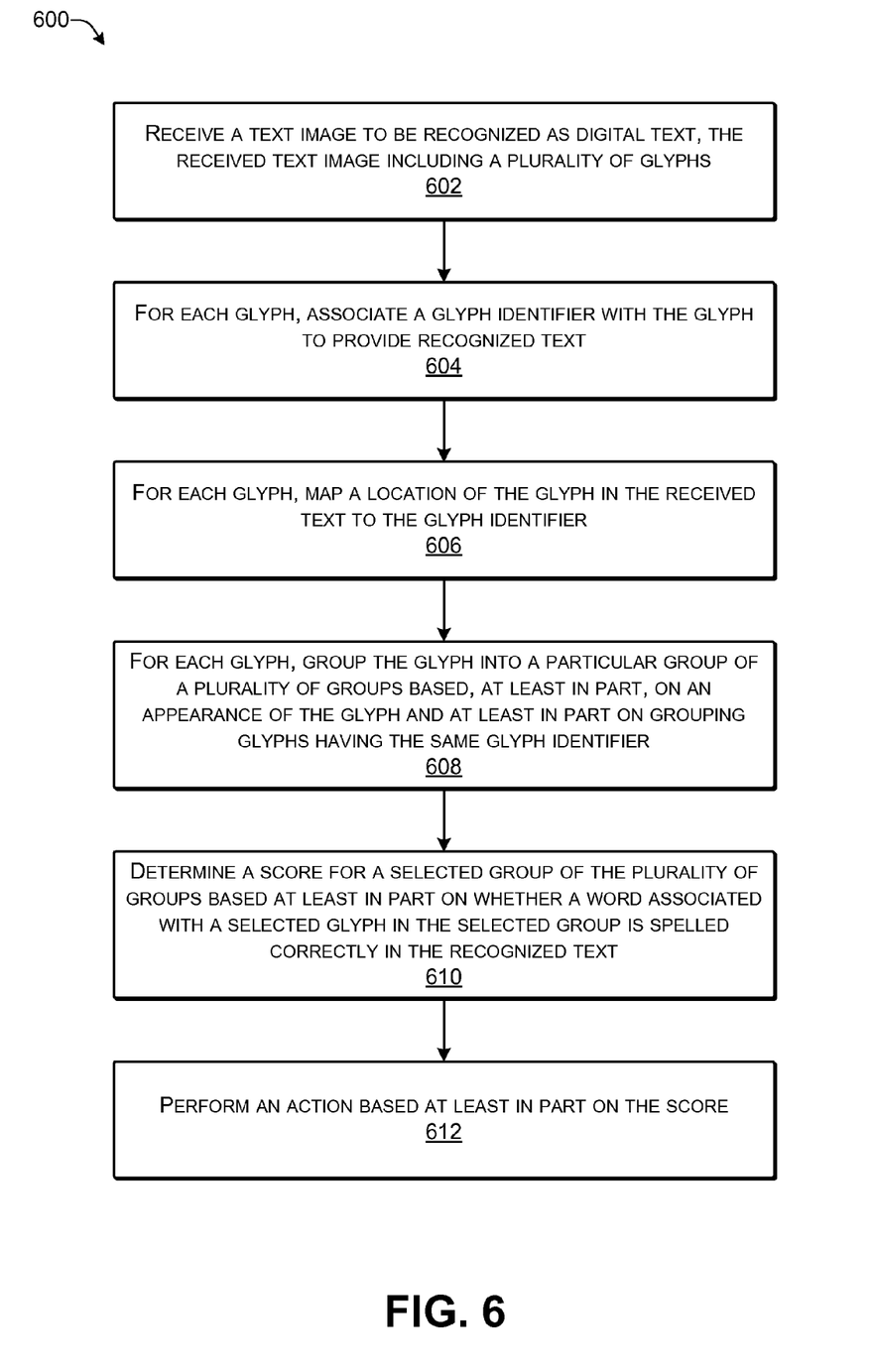
FIG. 6 is a flow diagram illustrating an example process to detect errors in recognized text according to some implementations.
Figure 7:
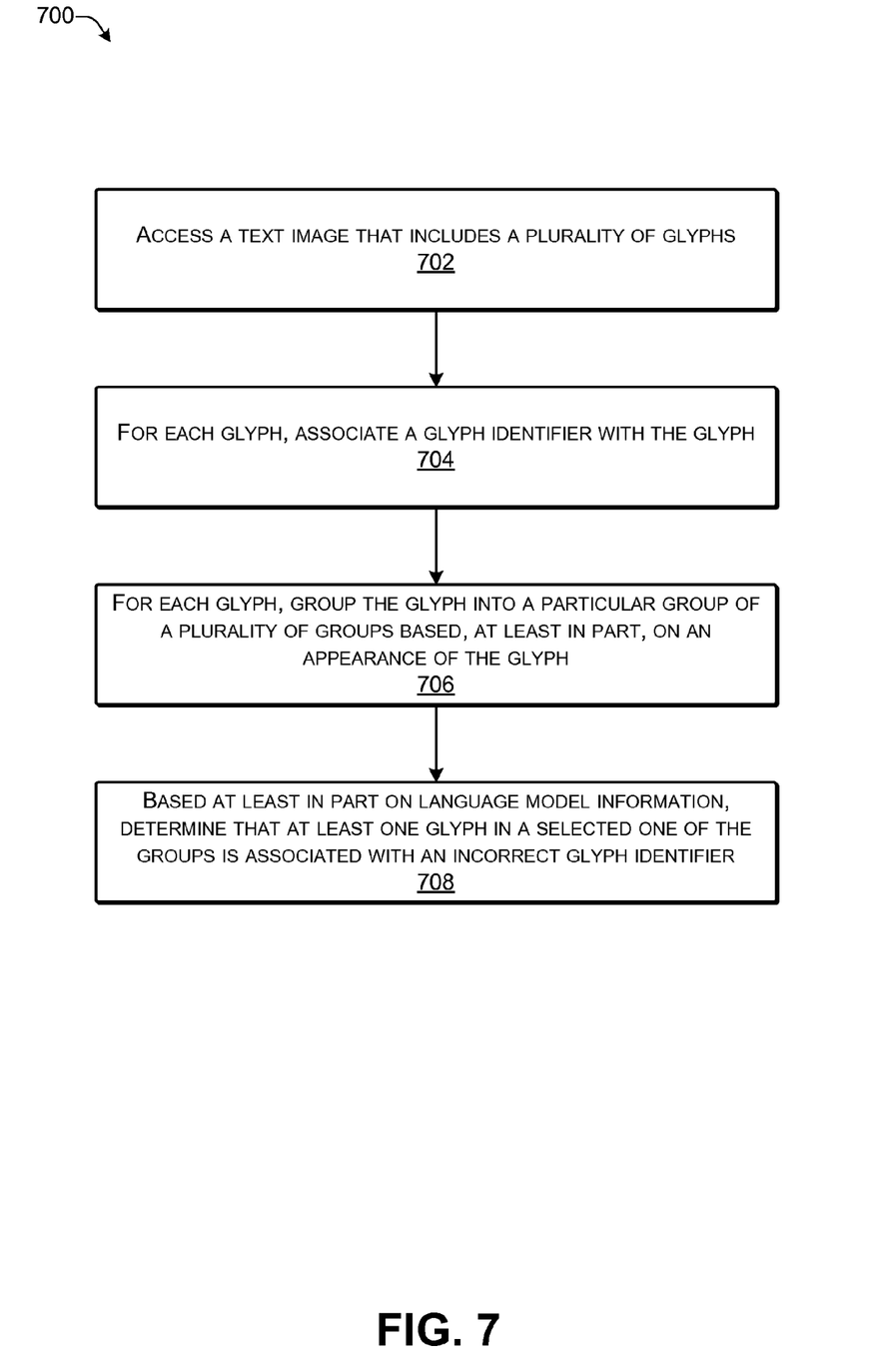
FIG. 7 is a flow diagram illustrating an example process to detect errors in recognized text according to some implementations.

FIGS. 6-7 are flow diagrams illustrating an example processes to detect errors in recognized text according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

The process of FIG. 6 is just one possible example of a technique for detecting errors in recognized text. Accordingly, implementations herein are not limited to the specific examples shown and described. In some examples, the process 600 of FIG. 6 may be executed by one or more computing devices, such as one or more computing devices of a content item provider, or other entity, executing the modules 414-422 discussed above, or other suitable computer code.

At 602, the computing device may receive text to be recognized as digital text, the received text including a plurality of glyphs. For example, the computing device may receive a text image, such as an image of text obtained from a scanner, or other imaging device.

At 604, for each glyph of the plurality of glyphs, the computing device may associate a glyph identifier with the glyph to provide recognized text. For example, the computing device may perform OCR on the received text to associate a glyph identifier with each glyph in the received text to provide OCR-recognized text. In some examples, the OCR may comprise at least one of comparing an image of a glyph with a plurality of patterns of known glyphs, or comparing features extracted from the image of the glyph with patterns of known features of glyphs.

At 606, for each glyph of the plurality of glyphs, the computing device maps a location of the glyph in the received text to the glyph identifier for that glyph. For example, the computing device may establish a many-to-one mapping of glyph locations to corresponding glyph identifiers.

At 608, for each glyph of the plurality of glyphs, the computing device may group the glyph into a particular group of a plurality of groups based, at least in part, on an appearance of the glyph and at least in part on grouping together glyphs having the same glyph identifier. For example, the computing device may only group together those glyphs that have the same glyph identifier associated therewith. Furthermore, the grouping of the glyphs may also be based on a similarity of the appearance of the glyphs to one another in any particular group. In some examples, the grouping may be based on comparing an appearance of the glyph with a representative image of the particular group.

At 610, the computing device may determine a score for a selected group of the plurality of groups based at least in part on whether a word associated with a selected glyph in the selected group is spelled correctly in the recognized text. For example, the computing device may access dictionary information or other language model information to determine whether a word associated with a selected glyph in a particular group is spelled correctly, or is otherwise a valid word. Having a word spelled correctly may increase the overall score of the group, whereas, if the word is spelled incorrectly, the overall score of the group may be decreased.

At 612, the computing device performs an action based at least in part on the score. For example, if the score of the selected group fails to meet a threshold, then the glyphs in that group may be associated with an incorrect glyph identifier. Accordingly, the action may include substituting a different glyph identifier for a current glyph identifier associated with the glyphs in the selected group. The computing device may then determine a new score for the selected group based at least in part on the different glyph identifier. If the different glyph identifier results in a higher score for the group, all of the glyphs in the group may be associated with the different glyph identifier. As another example, the action may include flagging the selected group for review by a person, or sending information related to the selected group to a computing device for review by a person.

FIG. 7 is a flow diagram illustrating an example process 700 to detect errors in recognized text according to some implementations. The process 700 may be performed by a computing device, such as one or more computing devices of a content item provider, or other entity.

At 702, the computing device accesses text that includes a plurality of glyphs. For example, the computing device may access a scanned image of text, or other image that includes text that may be recognized using OCR or other automated text recognition techniques.

At 704, for each glyph of the plurality of glyphs, the computing device associates a glyph identifier with the glyph. For example, during recognition, the computing device may associate a particular corresponding glyph identifier with each glyph of the plurality of glyphs in the text.

At 706, for each glyph of the plurality of glyphs, the computing device groups the glyph into a particular group of a plurality of groups based, at least in part, on an appearance of the glyph. For example, glyphs that appear similar to one another within a similarity threshold may be grouped into the same group. In some cases, the grouping may further be limited such that only glyphs associated with the same glyph identifier are grouped together.

At 708, based at least in part on language model information, the computing device may determine that at least one glyph in a selected one of the groups is associated with an incorrect glyph identifier. For example, the computing device may compare a word associated with the glyph with the language model information to determine whether the word is valid, such as by checking a spelling of the word against dictionary information included in the language model information. As another example, the validity of the word may be determined based on a comparison of the word and one or more words before and after the word in the recognized text with 2-word or 3-word n-grams in the language model information. In some cases, when an incorrect glyph identifier is associated with a selected group, the computing device may determine a correct glyph identifier to be associated with the glyphs in the selected group.

Figure 8:
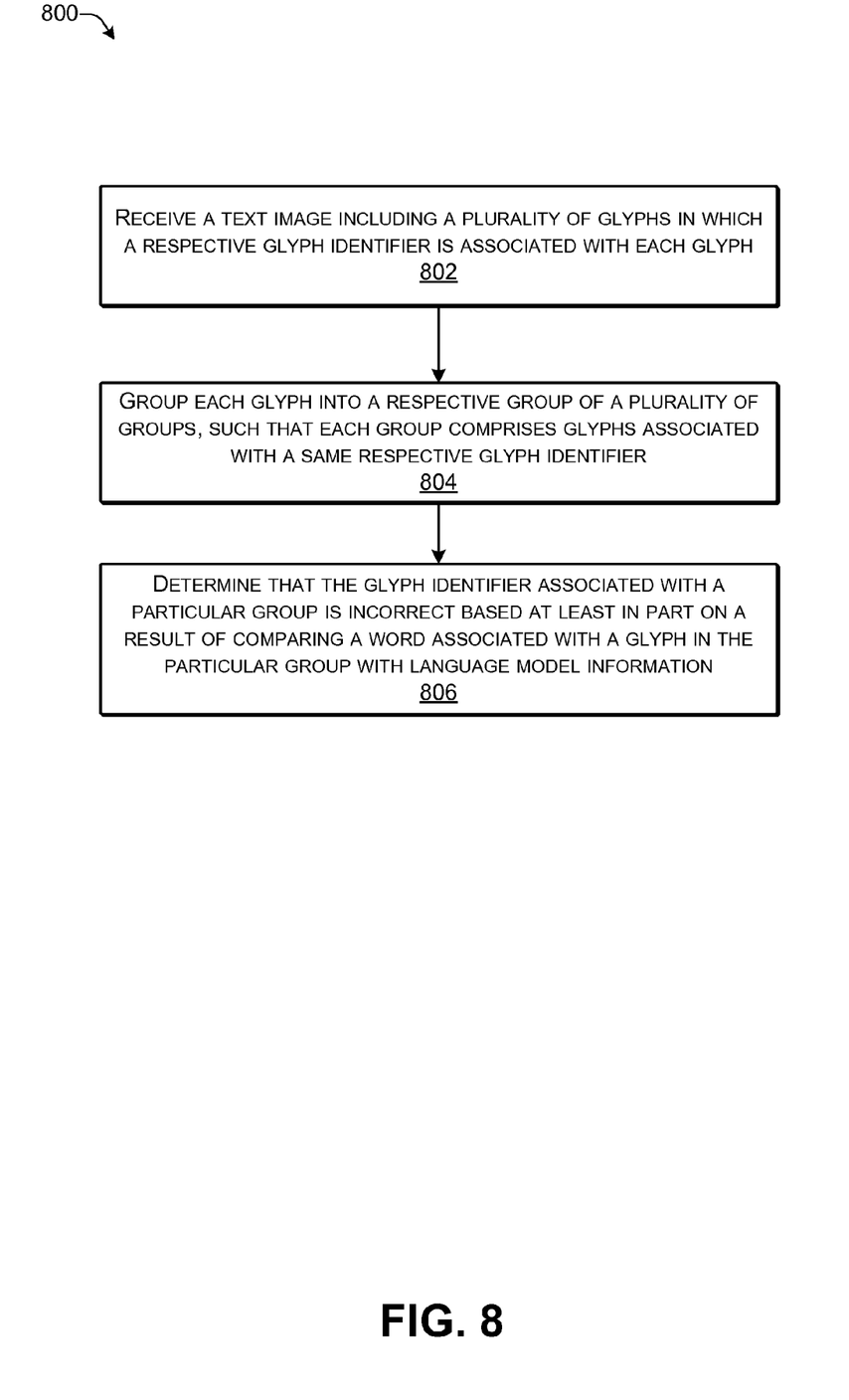
FIG. 8 is a flow diagram illustrating an example process to detect errors in recognized text according to some implementations.

FIG. 8 is a flow diagram illustrating an example process 800 to detect errors in recognized text according to some implementations. The process 800 may be performed by a computing device, such as one or more computing devices of a content item provider, or other entity.

At 802, the computing device receives text including a plurality of glyphs in which a respective glyph identifier is associated with each glyph. For example, the computing device may receive text that has already undergone optical character recognition or the like. Accordingly, respective glyph identifiers may already be associated with each glyph in the received text.

At 804, the computing device groups each glyph into a respective group of a plurality of groups such that each group comprises glyphs associated with a same respective glyph identifier. For example, each group may contain only glyphs that are associated with the same glyph identifier. Thus, a group in which each glyph is associated with a code point 99 (lowercase "c") would not receive a glyph that is associated with a code point 101 (lowercase "e") or vice versa, even though the glyphs may appear similar in some cases.

At 806, the computing device determines that the glyph identifier associated with a particular group is incorrect based at least in part on a result of comparing a word associated with a glyph in the particular group with language model information. For example, the computing device may compare a word associated with the glyph with the language model information to determine whether the word is a valid word according to the language model information. As mentioned above, when the glyph identifier associated with the particular group is incorrect, the computing device may attempt to determine a correct glyph identifier for the group using the techniques described above.

Additionally, the example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. One or more non-transitory computer-readable media maintaining instructions executable by one or more processors to perform operations comprising:

receiving text to be recognized as digital text, wherein the received text includes a plurality of glyphs;

for each glyph of the plurality of glyphs:
associating a glyph identifier with the glyph to provide recognized text;
mapping a location of the glyph in the received text to the glyph identifier; and
grouping the glyph into a particular group of a plurality of groups based, at least in part, on an appearance of the glyph and based at least in part on grouping glyphs having a same glyph identifier;

determining a score for a selected group of the plurality of groups based at least in part on whether a word associated with a selected glyph in the selected group is spelled correctly in the recognized text; and performing an action based at least in part on the score.

2. The one or more non-transitory computer-readable media as recited in claim 1, wherein the action comprises:
substituting a different glyph identifier for a current glyph identifier associated with one or more glyphs in the selected group; and
determining a new score for the selected group based at least in part on the different glyph identifier.

3. The one or more non-transitory computer-readable media as recited in claim 2, further comprising determining scores for other groups of the plurality of groups based at least in part on the different glyph identifier.

4. The one or more non-transitory computer-readable media as recited in claim 1, wherein the action comprises at least one of:
flagging the selected group for review by a person; or
sending information related to the selected group to a computing device for review by a person.

5. The one or more non-transitory computer-readable media as recited in claim 1, wherein grouping the glyph further comprises comparing the glyph with a representative image of at least one of the groups for determining a similarity of the glyph, within a similarity threshold, to the representative image.

6. The one or more non-transitory computer-readable media as recited in claim 1, wherein the associating the glyph identifier with the glyph includes performing optical character recognition (OCR) on the received text, the OCR comprising at least one of:
comparing an image of a glyph from the received text with a plurality of patterns of known glyphs; or
comparing features extracted from the image of the glyph from the received text with patterns of known features of glyphs.

7. A method comprising:
under control of one or more processors configured with executable instructions,
accessing text that includes a plurality of glyphs;
for each glyph of the plurality of glyphs,
associating a glyph identifier with the glyph, and
grouping the glyph into a particular group of a plurality of groups based, at least in part, on an appearance of the glyph;
determining a score for the particular group of the plurality of groups based at least in part on language model information comparing a word associated with the glyph and at least a second word before or after the word associated with the glyph to a combination of words stored in the language model; and
based at least in part on the score, determining that the glyph in the particular group is associated with an incorrect glyph identifier.

8. The method as recited in claim 7, wherein:
the particular group includes multiple glyphs determined, based at least in part on the grouping, to have a similar appearance; and
each glyph of the multiple glyphs in the particular group is associated with a same glyph identifier.

9. The method as recited in claim 7, further comprising establishing, for each group, a representative image, wherein the grouping the glyph into the particular group is based, at least in part, on a comparison of the glyph with the representative image for the particular group.

10. The method as recited in claim 7, wherein the grouping the glyph into the particular group further comprises establishing a new group as the particular group when at least one of:
the glyph is associated with a glyph identifier that is not associated with other currently existing groups; or
an appearance of the glyph is not similar, within a threshold, to a representative image of a group that is associated with a same glyph identifier as the glyph.

11. The method as recited in claim 7, further comprising:
determining that at least one group of the plurality of groups has a population of glyphs that is below a sparseness threshold; and
performing at least one of:
flagging the at least one group for review; or
sending information related to the at least one group to a computing device for review.

12. The method as recited in claim 7, further comprising:
sending information related to the particular group to a computing device for review;
receiving, from the computing device, an indication of a glyph identifier to be applied to the particular group; and
associating each glyph in the particular group with the glyph identifier.

13. The method as recited in claim 7, further comprising substituting a different glyph identifier for a current glyph identifier associated with one or more glyphs in the particular group.

14. The method as recited in claim 7, further comprising determining the score for the particular group of the plurality of groups based, at least in part, on whether a word associated with a selected glyph in the selected group is spelled correctly in the recognized text.

15. The method as recited in claim 7, further comprising comparing the score for the particular group with a score threshold to determine that the glyph in the particular group is associated with an incorrect glyph identifier.

16. The method as recited in claim 15, further comprising:
receiving an updated score threshold based at least in part on a number of the plurality of groups being wrongly identified as being associated with an incorrect glyph identifier.

17. The method as recited in claim 7, wherein the associating the glyph identifier with the glyph includes performing optical character recognition (OCR) on the accessed text, the OCR comprising at least one of:
comparing an image of the glyph from the accessed text with a plurality of patterns of known glyphs; or
comparing features extracted from the image of the glyph from the accessed text with patterns of known features of glyphs.

18. The method as recited in claim 7, wherein the glyph identifier is at least one of:
a Unicode Standard code point;
a Universal Character Set code point; or
an American Standard Code for Information Interchange code point.

19. A system comprising:
one or more processors;
one or more computer-readable media; and
one or more modules maintained on the one or more computer-readable media that, when executed by the one or more processors, cause the one or more processors to perform operations including:
receiving text including a plurality of glyphs, wherein a respective glyph identifier is associated with each glyph;
grouping each glyph into a respective group of a plurality of groups, wherein each group comprises glyphs associated with a same respective glyph identifier;
determining a score for the respective group of the plurality of groups, the score being based at least in part on a result of comparing a word associated with a glyph in the respective group with language model information; and
determining that the glyph identifier associated with a particular group is incorrect based at least in part on the score.

20. The system as recited in claim 19, wherein the grouping further comprises establishing, for each group, a representative image, such that the grouping each glyph into the respective group is based, at least in part, on a comparison of the glyph with the representative image for the respective group.

21. The system as recited in claim 20, wherein the comparison of each glyph with the representative image for the respective group is performed based at least in part on a similarity threshold.

22. The system as recited in claim 19, further comprising, prior to receiving the text, for each glyph of the plurality of glyphs:
associating the glyph identifier with the glyph to provide recognized text; and
mapping a location of the glyph in the received text to the glyph identifier.

23. The system as recited in claim 22, wherein the associating the glyph identifier with the glyph includes performing optical character recognition (OCR) on the received text, the OCR comprising at least one of:
comparing an image of a glyph from the received text with a plurality of patterns of known glyphs; or
comparing features extracted from the image of the glyph from the received text with patterns of known features of glyphs.

24. The system as recited in claim 19, wherein the glyph identifier is at least one of:
a Unicode Standard code point;
a Universal Character Set code point; or
an American Standard Code for Information Interchange code point.

25. The system as recited in claim 19, the operations further comprising:
recognizing one or more named entities in the received text; and
comparing the word associated with the glyph in the particular group with one or more named entities recognized in the received text when determining that the glyph identifier associated with the particular group is incorrect.

* * * * *